(12) United States Patent
Neifer

(10) Patent No.: US 6,250,965 B1
(45) Date of Patent: Jun. 26, 2001

(54) CHIP CARD READING APPARATUS

(76) Inventor: Wolfgang Neifer, Rosenstrasse 9a, Freising (DE), D-85354

( * ) Notice: Subject to any disclaimer, the term of this patent is extended or adjusted under 35 U.S.C. 154(b) by 0 days.

(21) Appl. No.: 09/412,081

(22) Filed: Oct. 4, 1999

(51) Int. Cl.[7] .................................................. H01R 24/00
(52) U.S. Cl. ........................ 439/630; 439/946; 361/735; 361/737
(58) Field of Search .................... 439/630, 631, 439/946, 540.1, 541.5, 159; 361/735, 737

(56) References Cited

U.S. PATENT DOCUMENTS

| 5,490,792 | 2/1996 | Sugita | 439/159 |
| 5,679,007 | * 10/1997 | Potdevin et al. | 439/76.1 |
| 6,010,066 | * 1/2000 | Itou et al. | 361/735 |
| 6,097,605 | * 8/2000 | Klatt et al. | 439/946 |

FOREIGN PATENT DOCUMENTS 0 696 010  2/1996  (EP) .
2 298 743  9/1996  (GB) .

* cited by examiner

*Primary Examiner*—Paula Bradley
*Assistant Examiner*—Tho D. Ta

(57) ABSTRACT

An apparatus for reading chip cards with at least one channel receiving a chip card and having at least one read head, the apparatus being detachably insertable into a receiving shaft intended for receiving modules in a computer, whereby in the channel for receiving at least one chip card two back limiting walls are provided in two different planes which are disposed at different distances from the opening of the channel so that two chip cards disposed directly one above the other are insertable into the channel by different lengths, permits insertion of two chip cards into a receiving channel in simple fashion in that a prestressing device is provided which is so prestressed that upon insertion into the empty apparatus the lower of the two chip cards is pressed into the lower plane in the direction out of the plane of the upper of the two different planes, the prestressing device being disposed on the upper limiting wall of the upper of the two different planes.

9 Claims, 1 Drawing Sheet

CHIP CARD READING APPARATUS

FIELD OF THE INVENTION

This invention relates to an apparatus for reading chip cards with at least one channel receiving a chip card and having at least one read head, the apparatus being detachably insertable into a receiving shaft intended for receiving modules in a computer, whereby in the channel for receiving at least one chip card two back limiting walls are provided in two different planes disposed at different distances from the opening of the channel so that two chip cards disposed directly one above the other are insertable into the channel by different lengths.

BACKGROUND OF THE INVENTION

The prior art shows a plurality of different chip cards which are used for credit purposes, for telephoning or for security tasks and information transmission. The chip cards usually have standard credit card format and are read in chip card readers designed in many different ways. Separate chip card readers are known for this purpose which are insertable into a receiving shaft in a computer to transfer chip card data to the computer. However, it is necessary or advantageous for diverse applications to connect two separate chip cards with a computer and make a connection between the particular cards.

It is known from EP 0 696 010 A1 to use two chip cards simultaneously with a chip card reader, the cards being insertable into the reader at different depths. The two cards are also insertable into a common receiving channel in which a projection is provided to cause defined positioning of the cards within the receiving channel. However, it can happen that a first inserted card gets caught on the projection, thereby impeding the insertion process.

GB 2 298 743 A discloses a chip card reading apparatus of the abovementioned kind. In this known apparatus as well; however, when one chip card is inserted into the corresponding channel there is always a possibility of the card getting caught on the projection or on the shoulder of the limiting wall provided for another card, which can make an insertion process difficult and tedious and damage the card.

The problem of the invention is to provide a chip card reading apparatus which permits two chip cards to be inserted into a receiving channel in simple fashion.

SUMMARY OF THE INVENTION

This problem is solved according to the invention by a prestressing device which is so prestressed that upon insertion into the empty apparatus the lower of the two chip cards is pressed into the lower plane in the direction out of the plane of the upper of the two different planes, the prestressing device being disposed on the upper limiting wall of the upper of the two different planes.

Preferred developments of the invention are the subject of the subclaims.

DESCRIPTION OF BEST MODE OF THE INVENTION

Figure 1:
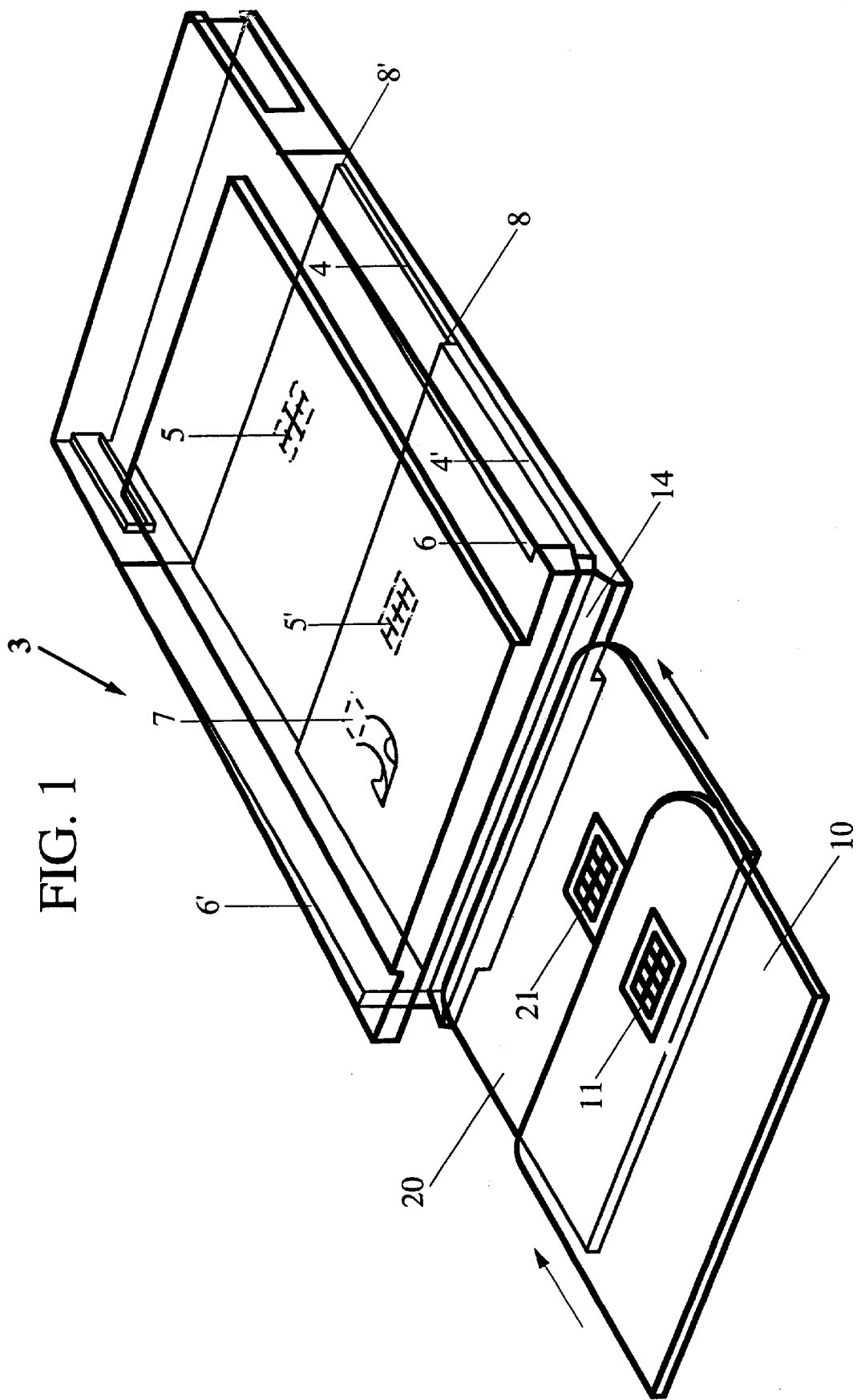
FIG. 1 schematically illustrates the invention.

In the inventive apparatus, providing a channel with two back limiting walls disposed in two different planes at different distances from the opening of the channel makes it possible for the chips of two chip cards inserted into the reading apparatus to come to lie so far apart in their particular end position, in which they adjoin the particular limiting wall of the channel, that they are each contactable with a read head disposed above a card. Simultaneously, the fact that the two chip cards project outwardly of the reading apparatus by different lengths when inserted in the reading apparatus ensures that at least one of the two chip cards remains recognizable and identifiable in the inserted position.

The feature of providing a prestressing device which is so prestressed that upon insertion into the empty apparatus the lower of the two chip cards is pressed into the lower plane in the direction out of the plane of the upper of the two different planes, the prestressing device being disposed on the upper limiting wall of the upper of the two different planes, makes it quintessentially possible to provide an apparatus in which the action of the prestressing device prevents one chip card inserted into the channel for receiving at least one chip card from coming against the wrong one of the two back limiting walls disposed in two different planes at different distances from the opening of the channel.

According to a preferred embodiment of the inventive reading apparatus, a prestressing device is provided which is so prestressed that, upon insertion into the empty apparatus, the lower of the two chip cards is pressed into the lower plane in the direction out of the plane of the upper of the two different planes. Alternatively, a prestressing device is provided according to the invention which is so prestressed that, upon insertion into the empty apparatus, the upper of the two chip cards is pressed into the upper plane in the direction out of the plane of the lower of the two different planes. This permits the inventive reading apparatus to read either only one chip card or both chip cards simultaneously.

If a prestressing device is provided which is so prestressed that upon insertion into the empty apparatus the lower of the two chip cards is pressed into the lower plane in the direction out of the plane of the upper of the two different planes, the prestressing device is preferably disposed on the upper limiting wall of the upper of the two different planes. The prestressing device of the inventive reading apparatus is in this case preferably a leaf spring whose two ends adjoin the upper limiting wall of the upper of the two different planes.

This measure permits the prestressing device to be disposed at a place from where it acts directly in the direction of the position into which a first introduced chip card is to be guided.

According to this embodiment, the inventive reading apparatus is designed so that, in the inserted state of only the lower chip card, the chip of said card contacts with only a first read head. In the inserted state of both chip cards, the chip of the lower card contacts with only the first read head according to this embodiment, and the chip of the upper card contacts only with a second read head, the read heads being spaced apart in accordance with the distance of the two back limiting walls disposed in different planes.

However, if a prestressing device is provided which is so prestressed that, upon insertion into the empty apparatus, the lower of the two chip cards is pressed into the lower plane in the direction out of the plane of the upper of the two different planes, the prestressing device is preferably disposed on the lower limiting wall of the lower of the two different planes. The prestressing device of the inventive reading apparatus is in this case preferably a leaf spring whose two ends adjoin the lower limiting wall of the lower of the two different planes.

This measure also permits the prestressing device to be disposed at a place from where it acts directly in the direction of the position into which a first introduced chip card is to be guided.

According to this embodiment, the inventive reading apparatus is designed so that, in the inserted state of only the upper chip card, the chip of said card contacts with only a first read head. In the inserted state of both chip cards, the chip of the upper card contacts with only the first read head according to this embodiment, and the chip of the lower card contacts only with a second read head, the read heads being spaced apart in accordance with the distance of the two back limiting walls disposed in different planes.

The inventive apparatus has in its front area preferably two centering elements for positioning the operating position of the chip card in the reading apparatus. The centering elements can be of straight form, or they can be of bent form in accordance with the radius of curvature of the corners of an ISO IC card. This obtains reliable positioning of the particular chip cards in their operating position.

In the inventive reading apparatus, insertion of the at least one chip card into the apparatus can be facilitated if guide belts are provided on the side surfaces of the apparatus for guiding the chip card in the channel and guiding the apparatus in the receiving shaft.

Alternatively, insertion of the at least one chip card into the reading apparatus can be facilitated if the apparatus has a front area insertable into the receiving shaft of a computer, and a back area shorter than the front area, the height and the width of the back area being greater than those of the receiving shaft of the computer, and guide means for chip cards to be inserted into the first part being provided in the back area.

The inventive chip card reading apparatus will be explained in the following with reference to a preferred embodiment shown in the FIGURE of the drawing, whereby:

FIG. 1 shows an embodiment of the inventive reading apparatus for inserting two chip cards in an oblique top view.

In inventive chip card reading apparatus 3 shown in FIG. 1, two chip cards 10, 20 are introducible into entry opening 14 of channel 4, 4', cards 10, 20 coming to lie directly one above the other in channel 4, 4' in the introduced state. Channel 4, 4' has in two different planes two back limiting walls 8, 8' disposed at different distances from entry opening 14 of channel 4 so that the two cards 10, 20 are insertable into channel 4 by different lengths. In the inserted state of card 20, chip 21 contacts with read head 5, whereby if card 10 is simultaneously inserted chip 11 contacts with read head 5'. On the upper limiting wall of channel 4' there is leaf spring 7 which causes card 20 to be pressed upon insertion into empty reading apparatus 3 in the direction of channel 4 in the direction away from limiting wall 8. During insertion, cards 10, 20 are guided laterally by belts 6, 6' which are disposed on the side surfaces of reading apparatus 3 and extend up to about ¾ of the length of the side surfaces of the reading apparatus. Belts 6, 6' moreover cause reliable insertion of reading apparatus 3 into a receiving shaft (not shown) in a computer.

What is claimed is:

1. An apparatus for reading chip cards, the apparatus comprising:

a channel having an opening for receiving said chip cards;

a first read head for reading a chip on the chip card received in the channel;

upper and lower back limiting walls on the channel, arranged in upper and lower planes, respectively, that are positioned at different distances from the channel opening so that upper and lower chip cards positioned directly one above the other are insertable into the channel by different lengths; and a prestressing device positioned in the upper limiting wall of the channel so that, upon insertion into the channel in an empty state of the lower chip card is pressed into a lower card position;

wherein the apparatus is detachably insertable into a receiving shaft intended for receiving modules in a computer.

2. An apparatus according to claim 1, wherein said prestressing device is a leaf spring whose two ends adjoin said upper limiting wall.

3. An apparatus according to claim 1, wherein when said lower chip card is inserted into said channel, said chip of said card contacts said read head.

4. An apparatus according to claim 1, further comprising a second read head, wherein, when said upper and lower cards are inserted into said channel, said chip of said lower card contacts said first read head and the chip of said upper card contacts the second read head, the two read heads being spaced apart in accordance with said different distances of said two back limiting walls from said opening in said channel.

5. An apparatus according to claim 1, wherein, when said upper chip card is inserted into said channel, said chip of said upper card contacts said read head.

6. An apparatus according to claim 1, further comprising at least one guide belt positioned on a side surface of said channel, for guiding at least one of said chip cards in said channel.

7. An apparatus according to claim 1, further comprising first and second centering elements for positioning said chips of said upper card and lower card, respectively, on said two back limiting walls.

8. An apparatus according to claim 7, wherein at least one of said centering elements is of straight form.

9. An apparatus according to claim 7, wherein at least one of said centering elements is of bent or curved form.

* * * * *